United States Patent [19]

Fujita

[11] Patent Number: 4,980,248
[45] Date of Patent: Dec. 25, 1990

[54] MOLTEN CARBONATE TYPE FUEL CELL

[75] Inventor: Yoji Fujita, Amagasaki, Japan

[73] Assignee: Mitsubishi Denki Kabushiki Kaisha, Tokyo, Japan

[21] Appl. No.: 375,688

[22] Filed: Jul. 5, 1989

[30] Foreign Application Priority Data

Jul. 5, 1988 [JP] Japan .................. 63-165811

[51] Int. Cl.$^5$ .............................. H01M 8/14
[52] U.S. Cl. ........................ 429/46; 429/16; 429/41
[58] Field of Search ............. 429/16, 46, 41

[56] References Cited

U.S. PATENT DOCUMENTS

| | | | |
|---|---|---|---|
| 4,564,567 | 1/1986 | Kucora et al. | 429/41 |
| 4,591,538 | 5/1986 | Kunz | 429/46 X |
| 4,643,954 | 2/1987 | Smith | 429/16 X |
| 4,797,379 | 1/1989 | Patel et al. | 429/41 X |

OTHER PUBLICATIONS

Oak Ridge National Laboratory ORNL-6181, Thermodynamics of Chromium and Iron in Carbonate Salts at 650 by H. S. Hsu and J. H. Devan (May 1985).

Primary Examiner—Stephen J. Kalafut
Attorney, Agent, or Firm—Oblon, Spivak, McClelland, Maier & Neustadt

[57] ABSTRACT

A molten carbonate type fuel cell with a stabilized battery characteristic over a long period of time by replenishing the electrolyte which has been consumed, and maintaining the electrolyte at a consistent composition, the fuel cell carrying, on at least one of the electrolytic layer at its side of the air electrode, the air electrode per se, and the structural members of the air electrode side gas chamber, a lithium-containing composite oxide which brings about chemical reaction, when a ratio of lithium (Li) to potassium (K) in the electrolyte reduces, to produce $Li_2CO_3$ due to change in the ratios between lithium and other elements, during a period when the Li/K ratio between lithium and potassium in the electrolyte comprising mainly $Li_2CO_3$ and $K_2CO_3$ varies from 40/60 to 70/30 at a temperature range of from 600° C. to 700° C. in a gas atmosphere of the air electrode side.

10 Claims, 4 Drawing Sheets

MOLTEN CARBONATE TYPE FUEL CELL

BACKGROUND OF THE INVENTION

FIELD OF THE INVENTION

This invention relates to a molten carbonate type fuel cell.

The construction of the conventional fuel cell of this type is as shown in FIG. 2 of the accompanying drawing.

As can be seen from the drawing, the molten carbonate type fuel cell using, for example, alkali metal carbonate as an electrolyte is generally constructed with an electrolytic layer 1 composed of an electrolyte and a substance which is inactive to the electrolyte; a fuel electrode 2 and an air electrode 3, both being juxtaposed to and in contact with the electrolytic layer in a manner to sandwich the same between them; a gas chamber 7 to the side of the fuel electrode 2, which comprises a fuel electrode side current collecting plate 4 for collecting electric current from the fuel electrode, physically supporting the structural members of the cell, and causing the reactive gas to flow, a gas flow passage plate 5, and a separator 6a with its surface being opposed to the fuel electrode 2; and another gas chamber 10 to the side of the air electrode 3, which comprises an air electrode side current collecting plate 8, a gas flow passage plate 9, and a separator 6b with its surface being opposed to the air electrode 3. Heretofore, the air electrode side gas chamber 10 is constructed with stainless steel (for example, "SUS316L"). However, the corrosion-resistant property of the stainless steel is not sufficient against the electrolyte which has exuded from the electrolytic layer 1 with the consequence that the stainless steel reacts with the electrolyte to cause the main consumption of the $Li_2CO_3$ of the electrolyte. In spite of such drawback in the conventional fuel cell, the present situation is such that no sufficient measures have been taken to solve the problem of this $Li_2CO_3$ consumption.

FIG. 3 is a graphical representation showing changes, with a lapse of time, in the quantity of the electrolyte to be consumed by its reaction with the structural members of the air electrode side gas chamber 10 per effective area (1 cm$^2$) of the electrolytic layer in the conventional fuel cell.

Since the conventional molten carbonate type fuel cell is constructed as described above, it has the problem such that the reaction between the structural members of the air electrode side gas chamber and the electrolyte which has exuded from the electrolytic layer brings about consumption of the electrolyte necessary for the cell operation, whereby the battery characteristic lowers with a lapse of time. Thus, the conventional fuel cell had its own inherent problem that the above-described disadvantages should le eliminated.

The present invention has been made with a view to solving the above-mentioned problem, and aims at providing an improved molten carbonate type fuel cell with a stabilized battery characteristic over a long period of time by replenishing the electrolyte which has been consumed, and maintaining the electrolyte at a consistent composition.

SUMMARY OF THE INVENTION

According to the present invention, in general aspect of it, there is provided a molten carbonate type fuel cell comprising, in combination: an electrolytic layer 1 composed of an electrolyte and a substance which is inactive to the electrolyte; a fuel electrode 2 and an air electrode 3, both of which are juxtaposed to and in contact with the electrolytic layer in a manner to sandwich the same therebetween; a gas chamber 7 to the side of the fuel electrode 2, which is constructed with a current collecting plate 4, a gas flow passage plate 5, and a separator 6a; and another gas chamber 10 to the side of the air electrode 3, which is constructed with a current collecting plate 8, a gas flow passage plate 9, and a separator 6b, the fuel cell being characterized in that there is carried on at least one of the electrolytic layer at its side facing to the air electrode, the air electrode per se, and the structural members of the air electrode side gas chamber, a lithium-containing composite oxide which brings about chemical reaction, when a ratio of lithium (Li) to potassium (K) in the electrolyte reduces, to produce $Li_2CO_3$ due to change in the ratios between lithium and other elements, during a period when the Li/K ratio between lithium and potassium in the electrolyte comprising mainly $Li_2CO_3$ and $K_2CO_3$, varies from 40/60 to 70/30 at a temperature range of from 600° C. to 700° C. in a gas atmosphere of the air electrode side.

The foregoing object, other objects as well as specific construction and material used for the purpose of the present invention will be become more apparent and understandable from the following detailed description thereof, when read in conjunction with the accompanying drawing.

Figure 1:
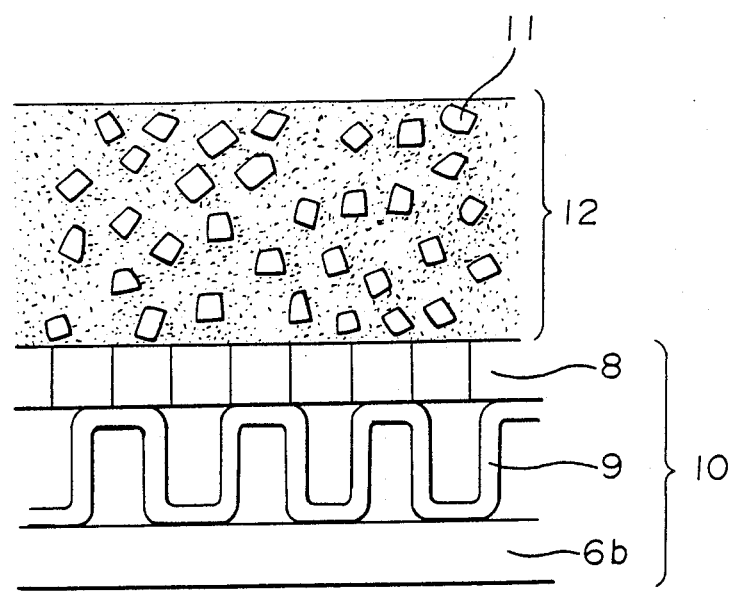
FIG. 1 is a cross-sectional side view showing a principal part of the construction of the air electrode and the structural members for the air electrode side gas chamber of the molten carbonate type fuel cell according to one embodiment of the present invention.

DETAILED DESCRIPTION OF THE PREFERRED EMBODIMENTS $LiFeO_2$, as one example of the lithium-containing composite oxide to be carried on the structural members for the air electrode side gas chamber, for example, according to the present invention, brings about the following chemical reaction to produce $Li_2CO_3$, when lithium carbonate in the fuel cell is consumed by the reaction between the structural members of the air electrode side gas chamber and the electrolyte, and when the relative concentration of potassium carbonate is increased.

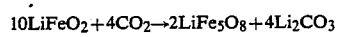

$$10LiFeO_2 + 4CO_2 \rightarrow 2LiFe_5O_8 + 4Li_2CO_3$$

The thus produced $Li_2CO_3$ is supplied to the electrolyte to thereby maintain the ratio of Li and K ions (Li:K) in the electrolyte at a predetermined constant value, lest the Li/K ratio becomes smaller.

In the following, one preferred embodiment of the present invention will be described in reference to FIG. 1. By the way, it should be noted that, in this embodiment, use is made of $LiFeO_2$ in granular form as the lithium-containing composite oxide, which is carried in the air electrode, and that FIG. 1 illustrates only the air electrode and the air electrode side gas chamber, of which the reference numerals 8, 9, 6b and 10 designate the same structural members as those in the conventional fuel cell shown in FIG. 2.

Referring to FIG. 1, a reference numeral 11 designates $LiFeO_2$ grains and a numeral 12 refers to the air electrode composed of a porous body of NiO, which has contains granular $LiFeO_2$.

The fuel cell of such construction according to the preferred embodiment of the present invention operates in the following manner.

Figure 2:
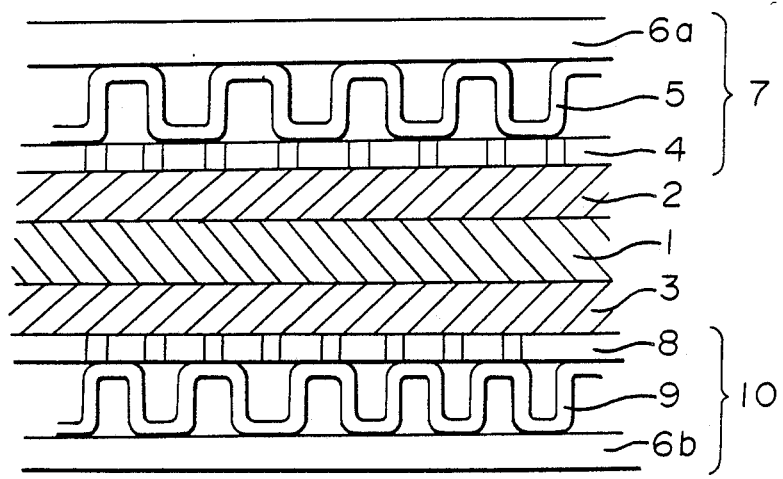
FIG. 2 is a cross-sectional view showing an overall construction of a conventional molten carbonate type fuel cell.

The electrolyte in the electrolytic layer 1 of FIG. 2 installed within the molten carbonate type fuel cell is gradually used up due to its evaporation, its wetting and spreading, or its reaction with the structural members of the air electrode side gas chamber 10, and others. In this case, the major cause for the electrolyte consumption at the side of the air electrode 12 is the reaction between $Li_2CO_3$ and oxides of iron, through which $Li_2CO_3$ is selectively used up. As the result of this, the ratio of Li:K in the electrolyte shifts from its initial value of 62:38 to a smaller value.

On the other hand, when use is made of 70% air and 30% carbon dioxide as the gas for the air electrode side, $LiFeO_2$, which has been carried beforehand on the air electrode 12, reacts with $CO_2$ in the gas for the air electrode side to discharge $Li_2CO_3$, and this discharged $Li_2CO_3$ is supplied into the electrolyte which has been deprived of $Li_2CO_3$, to thereby maintain the ratio of Li:K at a constant value (approximately 60:40) and prevent the fuel cell from reducing its battery characteristic.

Figure 3:
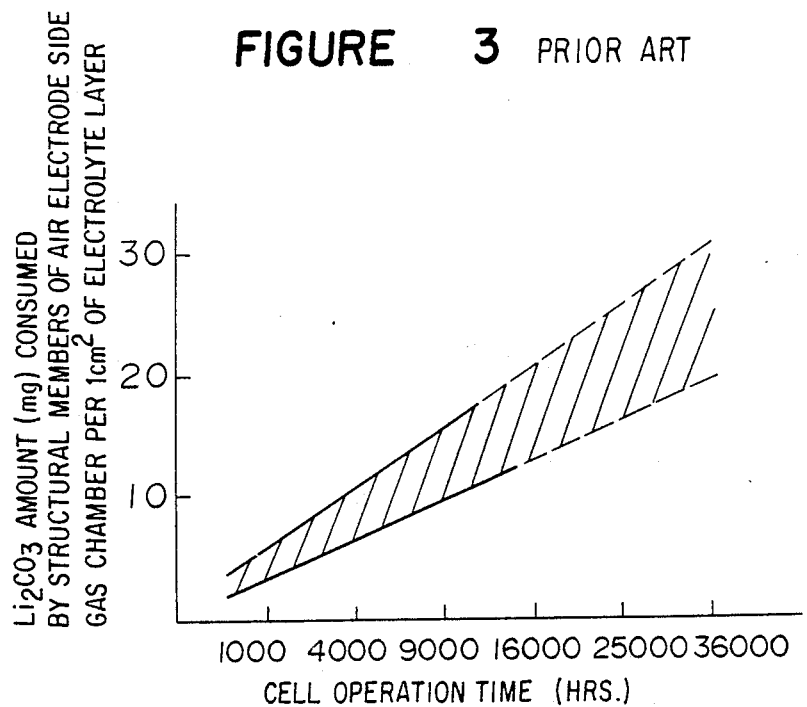
FIG. 3 is a graphical representation showing a relationship between an operating time and a quantity of $Li_2CO_3$ to be consumed per 1 cm$^2$ of the electrolytic layer in the molten carbonate type fuel cell shown in FIG. 2.

As shown in FIG. 3, in order to replenish the consumed $Li_2CO_3$ in the electrolyte and to realize the 40,000-hour operation of the fuel cell, it is necessary that $Li_2CO_3$ be supplied in a quantity of about 20 to 30 mg per 1 $cm^2$ of the electrolytic layer. In this case, even a small amount of $LiFeO_2$ added may exhibit an effect of feeding $Li_2CO_3$. To meet this purpose, $LiFeO_2$ should preferably be carried in a quantity of above 30 to 90 mg, but not exceeding 270 mg, per 1 $cm^2$ of the electrolytic layer.

The molten carbonate type fuel cell according to this embodiment carries in its electrolytic layer 100 mg/$cm^2$ of $LiFeO_2$, which makes it possible to provide a long service life which is higher by about 30% than those conventional molen carbonate type fuel cells not containing therein such lithium-containing composite oxide.

While, in the above-described embodiment, $LiFeO_2$ 11 is carried on the air electrode 12, the present invention is not limited to this mode of carrying the lithium-containing composite oxide, but it may also be carried on the electrolytic layer at its side facing to the air electrode 12, or on the structural members of the air electrode side gas chamber 10, such as on the current collecting plate 8, with the same resulting effect as in the above-described embodiment.

As for the lithium-containing composite oxides, there may also be used those, in which a part of Fe in $LiFeO_2$ is substituted with any one or combination of Mg, Ni, Cu, Al, and Cr, again with the same resulting effect as in the above described embodiment.

As has so far been described, since the present invention is so constructed that a lithium-containing composite oxide which brings about chemical reaction, when a ratio of lithium (Li) to potassium (K) in the electrolyte reduces, to produce $Li_2CO_3$ due to change in the ratios between lithium and other elements, during a period when the ratio between lithium and potassium varies from 40:60 to 70:30 at a temperature range of from 600° C. to 700° C. in a gas atmosphere of the air electrode side, is carried in at least one of the following relationships on or in the electrolytic layer at its side facing to the air electrode, in the air electrode per se, and on the structural members of the air electrode side gas chamber, there accrues a remarkable effect such that lithium can be replenished depending on the degree of consumption of lithium in the electrolyte to thereby maintain constant the composition of the electrolyte, and that the battery characteristic can be maintained over a longer period of time for the reliable battery operation.

Although, in the foregoing, the present invention has been described with specific details with reference to a preferred embodiment thereof, it should be noted that the invention is not limited to this embodiment alone, but any changes and modifications may be made by those persons skilled in the art to the material used and the structure of the fuel cell without departing from the spirit and scope of the invention as recited in the appended claims.

What is claimed is:

1. In a molten carbonate fuel cell comprising, in combination: an electrolytic layer composed of an electrolyte containing $Li_2CO_3$ and $K_2CO_3$ and a substance which is inactive to the electrolyte; a fuel electrode and an air electrode, both of which are juxtaposed to and in contact with said electrolyte layer in a manner to hold the same therebetween; the air electrode structural members comprising materials which tend to cause diminution of the Li/K ratio in the electrolyte; a gas chamber to the side of said fuel electrode, which is constructed with a current collecting plate, a gas flow passage plate, and a separator; and another gas chamber to the side of said air electrode, which is constructed with a current collecting plate, a gas flow passage plate, and a separator, the improvement wherein a lithium-containing composite oxide which brings about chemical reaction to produce $Li_2CO_3$, when a ratio of lithium (li) to potassium (k) in the electrolyte reduces, due to change in the ratios between lithium and other elements, during a period when the Li/K ratio between lithium and potassium in the electrolyte comprising mainly $Li_2CO_3$ and $K_2CO_3$, varies from 40/60 to 70/30 at a temperature range of from 600° C. to 700° C. in a gas atmosphere of the air electrode side, is carried in the fuel cell in at least one of the relationships (a) on or in the electrolytic layer at its side facing the air electrode (b) in the air electrode per se, and (c) on the structural members of the air electrode side gas chamber.

2. The fuel cell according to claim 1, wherein said lithium-containing composite oxide is $LiFeO_2$.

3. The fuel cell according to claim 1, wherein said lithium-containing composite oxide is in a granular form.

4. The fuel cell according to claim 1, wherein said lithium-containing composite oxide is present in relation to said electrolyte layer in a range of from 30 to 270 mg per 1 $cm^2$ of said electrolytic layer.

5. The fuel cell according to claim 4, wherein said lithium-containing composite oxide is present in a range of from 90 to 270 mg per 1 cm$^2$ of said electrolytic layer.

6. The fuel cell according to claim 1, wherein said lithium-containing composite oxide is one, in which a part of Fe in $LiFeO_2$ is substituted with at least one element selected from the group consisting of Mg, Ni, Cu, Al and Cr.

7. The fuel cell according to claim 1, wherein said lithium-containing composite oxide is carried on the electrolytic layer at its side facing the air electrode.

8. The fuel cell according to claim 1, wherein said lithium-containing composite oxide is carried on the air electrode.

9. The fuel cell according to claim 1, wherein said lithium-containing composite oxide is carried on the structural members of the air electrode side gas chamber.

10. The fuel cell of claim 1 wherein the air electrode is porous NiO containing granular particles of $LiFeO_2$.

* * * * *

UNITED STATES PATENT AND TRADEMARK OFFICE
CERTIFICATE OF CORRECTION

PATENT NO. : 4,980,248
DATED : Dec. 25, 1990
INVENTOR(S) : Yoji FUJITA

Figure 4:
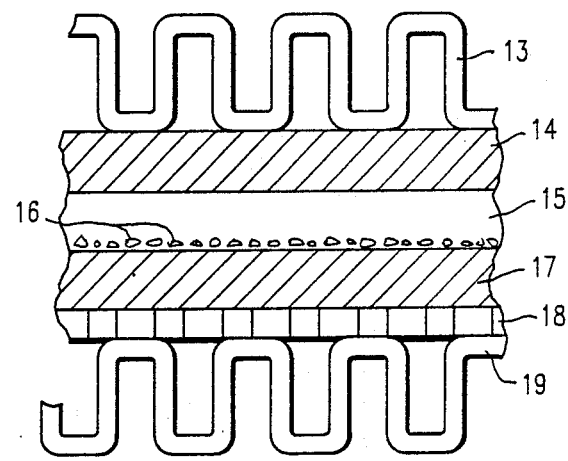

It is certified that error appears in the above-identified patent and that said Letters Patent is hereby corrected as shown below:

In Column 2, after Line 45, the following paragraphs should be inserted:

--Figure 4 is a cross-sectional view showing a molten carbonate type fuel cell having $LiFeO_2$ carried in matrix (electrolyte layer).

Figure 5:
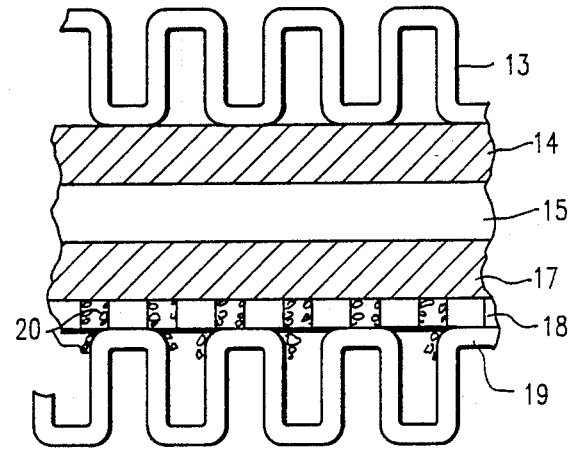

Figure 5 is a cross-sectional view showing a molten carbonate type fuel cell having $LiFeO_2$ carried on the current collector.--

In Column 3, after Line 61, the following paragraph should be inserted:

--In Figures 4 and 5, reference numeral 13 designates a current collector, numeral 14 an anode, numeral 15 an

UNITED STATES PATENT AND TRADEMARK OFFICE
CERTIFICATE OF CORRECTION

PATENT NO. : 4,980,248

DATED : Dec. 25, 1990

INVENTOR(S) : Yoji FUJITA

It is certified that error appears in the above-identified patent and that said Letters Patent is hereby corrected as shown below:

electrolyte layer, numeral 17 a cathode and numerals 18 and 19 the component parts of a current collector. Numeral 16 in Figure 4 and numeral 20 in Figure 5 designate $LiFeO_2$ particles.--

Signed and Sealed this

Twenty-first Day of July, 1992

Attest:

DOUGLAS B. COMER

Attesting Officer     Acting Commissioner of Patents and Trademarks